United States Patent
Tenny et al.

(10) Patent No.: US 10,412,614 B2
(45) Date of Patent: Sep. 10, 2019

(54) COORDINATION OF MEASUREMENT GAPS ACROSS SETS OF MULTIPLE FREQUENCIES

(71) Applicant: Futurewei Technologies, Inc., Plano, TX (US)

(72) Inventors: Nathan Tenny, Poway, CA (US); Bingzhao Li, Shenzhen (CN); Aimin Sang, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 50 days.

(21) Appl. No.: 15/789,751

(22) Filed: Oct. 20, 2017

(65) Prior Publication Data

US 2019/0124533 A1    Apr. 25, 2019

(51) Int. Cl.
*H04W 24/10* (2009.01)
*H04L 5/00* (2006.01)

(52) U.S. Cl.
CPC .......... *H04W 24/10* (2013.01); *H04L 5/0048* (2013.01)

(58) Field of Classification Search
CPC .......................... H04W 24/10; H04L 5/0048
See application file for complete search history.

(56) References Cited

U.S. PATENT DOCUMENTS

| | | | | |
|---|---|---|---|---|
| 8,750,807 B2 * | 6/2014 | Lin | ...................... | H04W 24/10 455/67.11 |
| 2013/0121342 A1 * | 5/2013 | Kim | ..................... | H04B 7/0408 370/436 |

(Continued)

FOREIGN PATENT DOCUMENTS

| WO | WO/2013/025154 | 2/2013 |
|---|---|---|
| WO | WO/2014/184602 | 11/2014 |
| WO | WO/2015/126568 | 8/2015 |

OTHER PUBLICATIONS

3GPP Organizational Partners; 3GPP TS 36.321 V14.4.0 ; 3rd Generation Partnership Project; Technical Specification Group Radio Access Network; Evolved Universal Terrestrial Radio Access (E-UTRA); Medium Access Control (MAC) protocol specification (Release 14) ; Sep. 2017, 108 pgs.

(Continued)

*Primary Examiner* — Curtis A Alia
(74) *Attorney, Agent, or Firm* — Paul C. Hashim

(57) ABSTRACT

Methods and apparatus for coordinating inter-frequency measurement gaps in a wireless network are disclosed. In various embodiments, a measurement gap pattern is determined and provided (via a serving frequency) to a user equipment (UE) in conjunction with frequency identification information identifying at least one target frequency. In accordance with the measurement gap pattern, the UE tunes a receiver to the target frequency and receives a reference signal upon which measurement operations are performed. Additional target frequencies can also be specified for the measurement gap pattern. In other embodiments, the frequency identification information identifies a band of target frequencies, any of which can be measured using the measurement gap pattern. In further embodiments, target frequencies employing overlapping reference signals are grouped into a timing group indicated by the frequency identification information. Broadcast or dedicated signaling can be utilized to associate target frequencies with a timing group or frequency band.

20 Claims, 13 Drawing Sheets

(56) References Cited

U.S. PATENT DOCUMENTS

2016/0337893 A1* 11/2016 Gheorghiu ............ H04W 24/10
2016/0338118 A1* 11/2016 Vajapeyam .......... H04B 17/318

OTHER PUBLICATIONS

3GPP Organizational Partners; 3GPP TS 36.300 V14.4.0; 3GPP TS 36.300 V14.4.0 (Sep. 2017) Technical Specification 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 14); Sep. 2017, 329 pgs.
3GPP Organizational Partners; 3GPP TS 36.331 V14.4.0; 3rd Generation Partnership Project; Technical Specification Group Radio Access Network; Evolved Universal Terrestrial Radio Access (E-UTRA); Radio Resource Control (RRC); Protocol specification (Release 14); Sep. 2017, 753 pgs.

\* cited by examiner

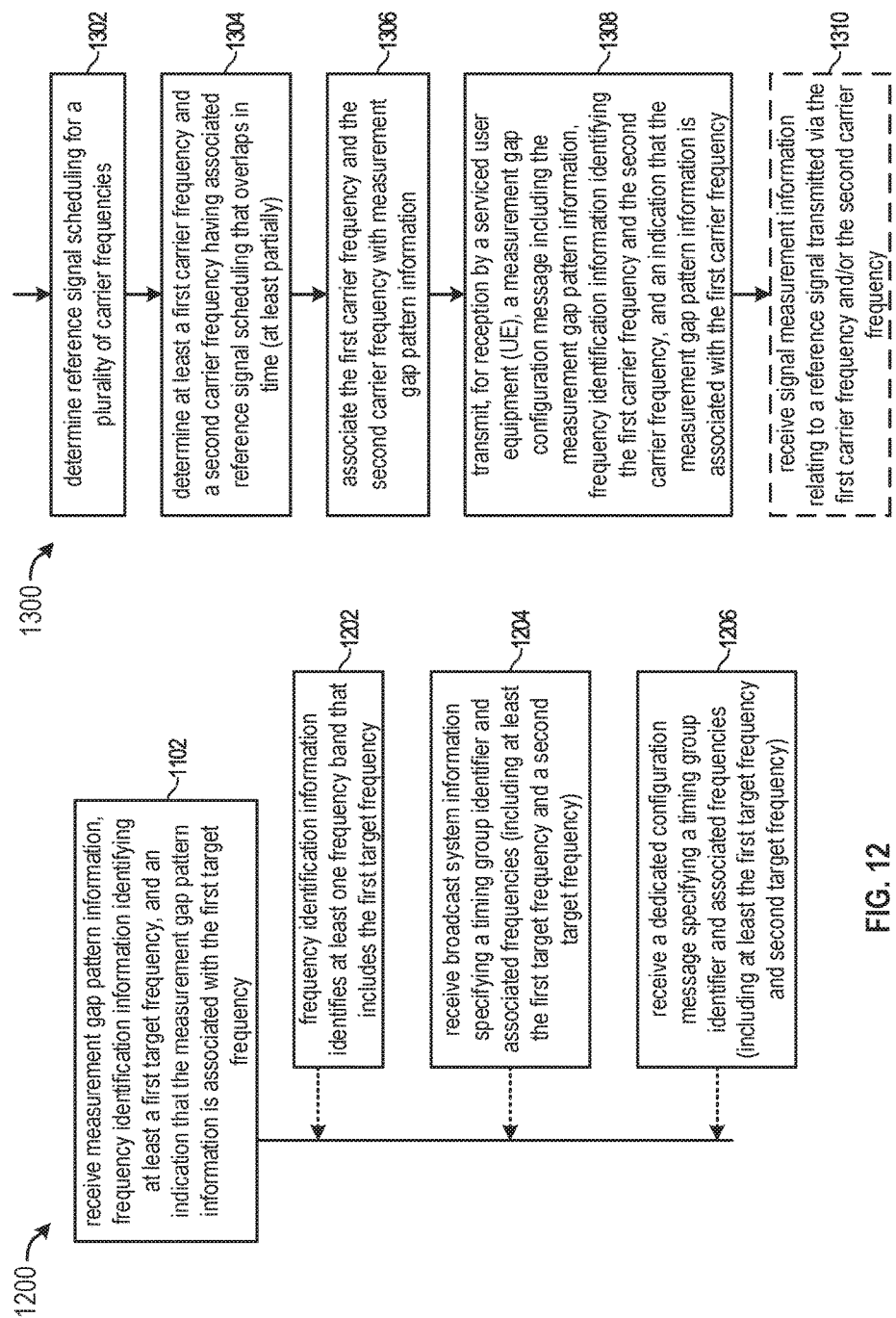

COORDINATION OF MEASUREMENT GAPS ACROSS SETS OF MULTIPLE FREQUENCIES

BACKGROUND

In existing cellular networks, the concept of a measurement gap was introduced in order to allow user equipment (UE) to perform measurement operations, such as measurements performed on carrier frequencies of neighboring cells and radio access technologies (RATs) supported by the UE. Typically, such measurements are used by the network to collect a variety of information regarding surrounding cells, including block error rates, transmit power and other UE-based parameters. A serving cell may utilize information reported by the UE to inform handover decisions. For example, when a neighboring cell offers better radio conditions leading to improved data rates, or the serving cell is nearing maximum capacity, a handover procedure may be initiated to activate the UE in the neighboring cell.

In general, measurement and reporting configuration information is provided to the UE through downlink signaling while the UE is in a connected state (e.g., an RRC_CONNECTED state of the RRC protocol used in existing 3GPP systems). During a scheduled time slot (also referred to as a "measurement gap"), downlink and uplink data scheduling with the UE is suspended to allow the UE sufficient time to tune to a different frequency, perform measurement operations, and then switch back to an active channel. Upon returning to the active channel, the UE may transmit a measurement report to provide requested measurement information to a serving cell.

SUMMARY

The present disclosure describes scalable methodologies for coordinating measurement gaps in a wireless network on a frequency-specific basis. A measurement gap configuration approach according to the present disclosure is thereby adaptable to support extreme variations in supported frequency bands and deployment scenarios.

In various embodiments of the disclosure, inter-frequency measurement gap patterns are associated with and applied to one or more specific "target" frequencies. For example, a measurement gap pattern can be determined for a target frequency and provided, via a measurement configuration message transmitted over a serving frequency, to a user equipment (UE) in conjunction with frequency identification information identifying at least one target frequency. In accordance with the measurement gap pattern, the UE tunes a receiver to the target frequency and receives a reference signal upon which measurement operations are performed. Additional target frequencies can also be associated with the measurement gap pattern in the measurement configuration message.

In other embodiments, the frequency identification information identifies a band of target frequencies, any of which can be measured using the measurement gap pattern. In further embodiments, target frequencies employing overlapping reference signals are grouped into a timing group identified by the frequency identification information. Broadcast or dedicated signaling can be utilized to associate target frequencies with a timing group or frequency band.

Other aspects and features of the present disclosure will become apparent to those of ordinary skill in the art upon review of the following description of specific implementations of the disclosure in conjunction with the accompanying figures.

BRIEF DESCRIPTION OF THE SEVERAL VIEWS OF THE DRAWINGS

FIG. 12 is a logic diagram illustrating examples of measurement gap configuration for a UE in accordance with embodiments of the present disclosure.

FIG. 13 is a logic diagram illustrating examples of generating a measurement gap configuration message in accordance with embodiments of the present disclosure.

DETAILED DESCRIPTION

Figure 1:
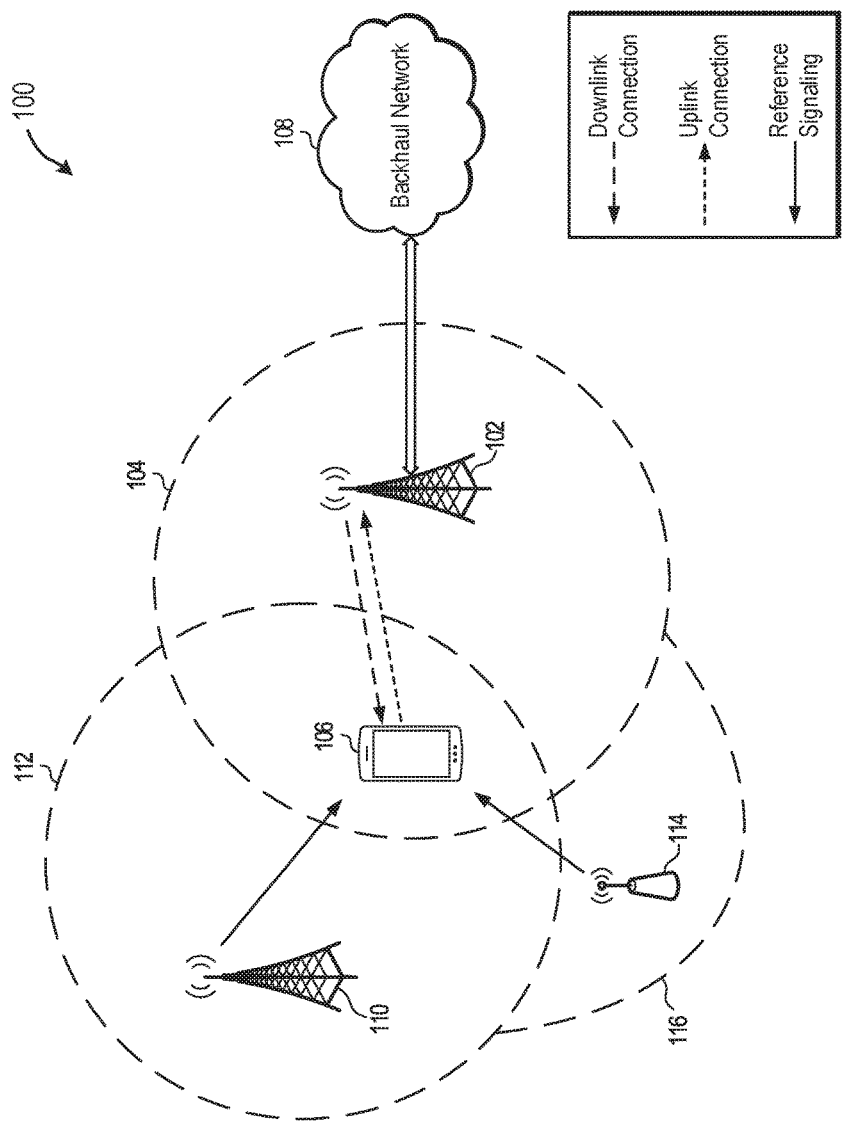
FIG. 1 illustrates a multi-cell wireless network in accordance with the present disclosure.

Numerous advancements in LTE have been realized since the introduction of measurement gaps. These include new technologies (e.g., carrier aggregation (CA), enhanced and further enhanced inter-cell interference coordination (eICIC and FeICIC), Coordinated Multi-Point transmission/reception (CoMP), dual-connectivity, etc.), new network topologies (e.g., heterogeneous networks with small cells), and an increased number of deployed bands and frequencies. Next generation air interfaces and networks supporting a relatively large number of frequency bands are also under development, including New Radio (NR) networks. Some of these new technologies, including NR, employ reference signals that are sparsely scheduled in time as compared to the "always on" reference signals of an LTE system.

In view of the increasing number of deployed bands and frequencies utilized in wireless communications systems, existing inter-frequency/inter-RAT measurement techniques face significant challenges in meeting system performance requirements. In such systems, it may not be feasible or even possible to utilize a particular measurement gap length and repetition period (referred to herein as a "measurement gap pattern") that covers reference signals on all target frequencies. For example, reference signals on different frequencies may not be synchronized and, as a result, a measurement gap start time and periodicity that effectively covers reference signals on one target frequency may not accommodate reference signals on a second target frequency. In addition, and as described more fully below, reference signals on different target frequencies can have differing lengths, further complicating measurement operations and leading to unnecessarily long measurement gaps.

Using LTE as an example, an inter-frequency measurement gap configuration (which includes a measurement gap pattern and related information) is communicated to a UE (via Radio Resource Control (RRC) signaling) along with measurement objects. The measurement gap configuration applies to all measurement objects, each of which corresponds to one—and only one—carrier frequency. That is, the measurement gap configuration applies for all carrier frequencies. In LTE, this is acceptable because all carrier frequencies have "always on" reference signals, meaning that the exact timing of the measurement gap does not affect whether the UE can receive reference signals on a given carrier frequency during the measurement gap. In other systems such as NR, where the reference signals are not transmitted continuously, a single measurement gap configuration for all carrier frequencies may not be appropriate.

The time occupied by measurement gaps can have a significant impact on system performance. It has been estimated, for example, that up to 15% of downlink/uplink resources in certain wireless networks are unavailable for data reception and transmission because of existing inter-frequency measurement gap configurations. Furthermore, an increasing number of UEs include multiple LTE-capable receiver chains. However, such UEs can only be provided with a single measurement gap pattern, thereby limiting the potential utilization of multiple receiver chains. In addition, unnecessarily long measurement gaps can further cause increased power consumption in a UE and, when multiple receiver chains are implemented in a single integrated circuit, give rise to interference issues.

To address such issues, the novel measurement gap configuration approaches introduced below provide enhancements to existing inter-frequency measurement techniques that are adaptable and scalable to support a large number of frequency bands and deployment scenarios, including scenarios in which reference signals are transmitted at different times on different carrier frequencies. In various embodiments of the disclosure, inter-frequency measurement gap patterns are associated with and applied to one or more specific target frequencies, timing groups and/or frequency bands.

Referring now to FIG. 1, an embodiment of a multi-cell wireless network 100 in accordance with the present disclosure is shown. The illustrated embodiment includes a transmit/receive point (TRP) 102, having a coverage area 104, and a user equipment (UE) 106. The TRP 102 of this embodiment services the UE 106 via downlink/uplink connections, and is further coupled to a backhaul network 108 through one or more fronthaul/backhaul communication links. Also illustrated are a TRP 110 and a TRP 114 having respective coverage areas 112 and 116.

The UE 106 represents any suitable end user device, and may also be referred to as a user wireless transmit/receive unit (WTRU), mobile station, or fixed or mobile subscriber unit, and may include a cellular telephone, personal digital assistant, smartphone, laptop or tablet, for example. TRP 102, TRP 110 and TRP 114 of the wireless network 100 can include, for example, mobile-relay stations, base stations, eNBs, gNodeBs (sometimes called "gNBs"), site controllers, microcells, picocells, femtocells, and/or small-cell clusters, which can be used in conjunction with remote radio heads (RRHs) in some implementations. In NR implementations, the TRPs can include, but are not limited to gNBs, and may or may not utilize RRHs. As used herein, the term "cell" can include a NR cell (also known as a "hypercell" or "hyper cell").

A network implemented in accordance with this embodiment can include a different number of TRPs and UEs than is shown. For example, the frequency measurement techniques described herein are extensible to a network including more than three TRPs. Further, although not illustrated, TRPs 102-106 and the backhaul network 108 may communicate with each other, for example, utilizing an Xn interface, the latest CPRI standard, Coarse or Dense Wavelength Division Multiplexing technology, and/or mmWave to enable transmission of control and baseband signals over a relatively long distance. Frequency and phase synchronization between TRPs can be achieved, for example, by GPS links for each TRP, by CPRI interfaces between C-RAN servers of TRPs, and/or by measurements performed during a calibration procedure.

As noted, measurements of reference signaling over target frequencies utilized by neighboring cells may be performed by a UE 106 to facilitate handover operations. To facilitate measurement of a cell, even when the cell is inactive, a schedule for transmission of discovery signals (which are considered reference signals for purposes of this disclosure) can be coordinated by the wireless network 100. Discovery signals are typically transmitted with a lower periodicity than reference signals transmitted when a cell is active.

In an example, if the UE 106 has been configured with measurement gap pattern information and measurement criteria, it can monitor reference signals from neighboring cells (e.g., reference signaling from TRPs 110 and 114) as it moves through the network. When a specified reporting criteria/trigger event is met (e.g., a better cell or serving node is available), the UE 106 provides the results to TRP 102 by transmitting a measurement report over a serving frequency. The measurement report can communicate various information including, for example, reference signal received power (RSRP), reference signal received quality (RSRQ), the identity of detected cells, results of operator defined measurements, etc. If handover criteria are met, the TRP 102 or backhaul network 108 can then decide to initiate handover of the UE 106 to the neighboring cell. As described more fully below in conjunction with FIGS. 3, 4, 6 and 10, the measurement gap pattern information is provided to the UE 106 by the TRP 102 via one or more downlink connections.

Although the present disclosure describes various embodiments in the context of improvements to existing LTE standards, aspects of the disclosure may be applied to other standards compliant communication systems, as well as non-standards compliant communications systems employing measurement gaps.

Figure 2:
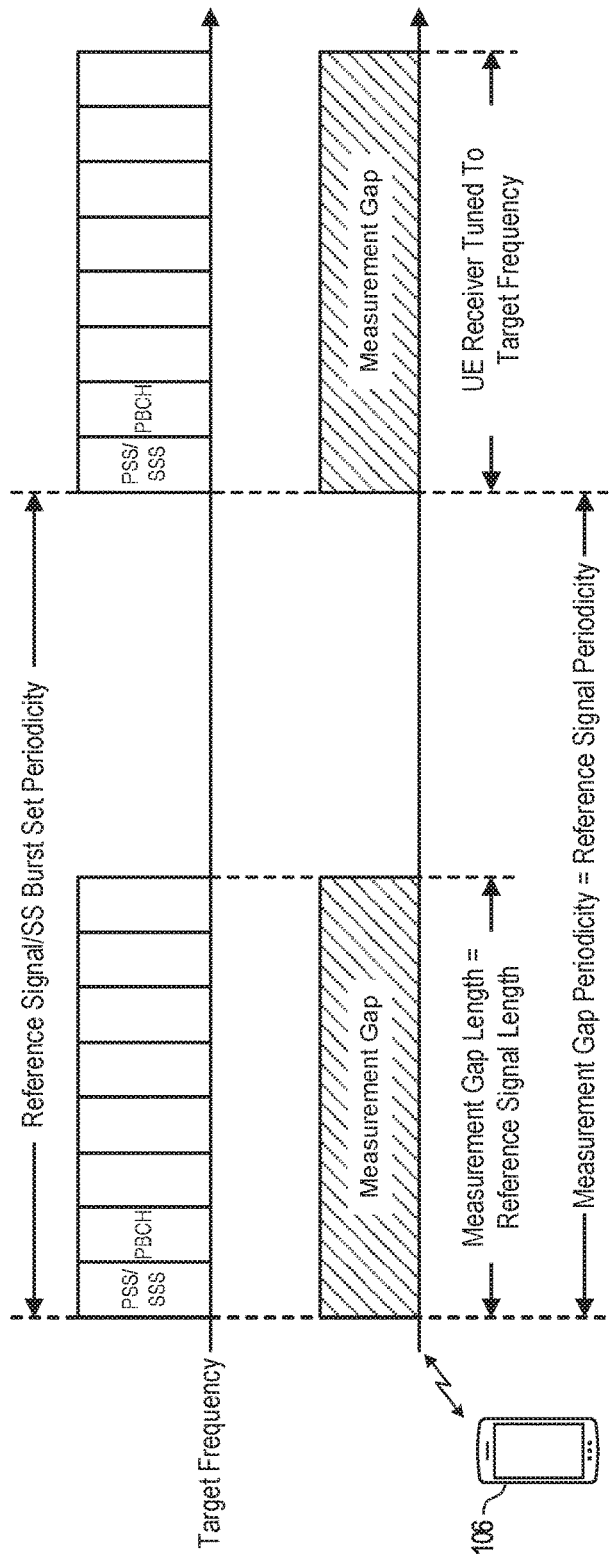
FIG. 2 illustrates a measurement gap pattern for a single target frequency in accordance with an embodiment of the present disclosure.

FIG. 2 illustrates a measurement gap pattern for a single target frequency in accordance with an embodiment of the present disclosure. In this embodiment, the UE 106 is configured with a measurement gap pattern for use in measuring a reference signal transmitted over a target frequency. To permit inter-frequency measurements, the measurement gap pattern used by UE 106 is generally required to be in alignment with the reference signaling of the target frequency such that a reference signal is available for the UE 106 to measure during a measurement opportunity. In the illustrated embodiment, for example, the length of a measurement gap corresponds to the length of the reference signal, and the measurement gap periodicity corresponds to the reference signal periodicity. It is noted that the alignment of the measurement gap with the reference signal timing in FIG. 2 is ideal, and a practical system may require a longer measurement gap than illustrated to compensate for possible differences between the timing of the UE and the timing of the target frequency.

The illustrated reference signal can be configured in many different ways depending on the network requirements. For example, the reference signal may include one or more of a primary synchronization signal (PSS) (used for radio frame synchronization), a secondary synchronization signal (SSS), an extended synchronization signal (ESS) (used in NR to identify an OFDM symbol index), PBCH/ePBCH signaling (used to convey system information), beam reference signals (e.g., according to a multi-beam sweeping pattern), beam refinement reference signals, a predefined data sequence/signal, a discovery reference signal (DRS), and the like. The reference signals may be transmitted in a non-contiguous manner, or in burst sets of synchronization signal (SS) blocks (also referred to as a SS burst set) having a reference signal periodicity such as illustrated.

Figure 5:
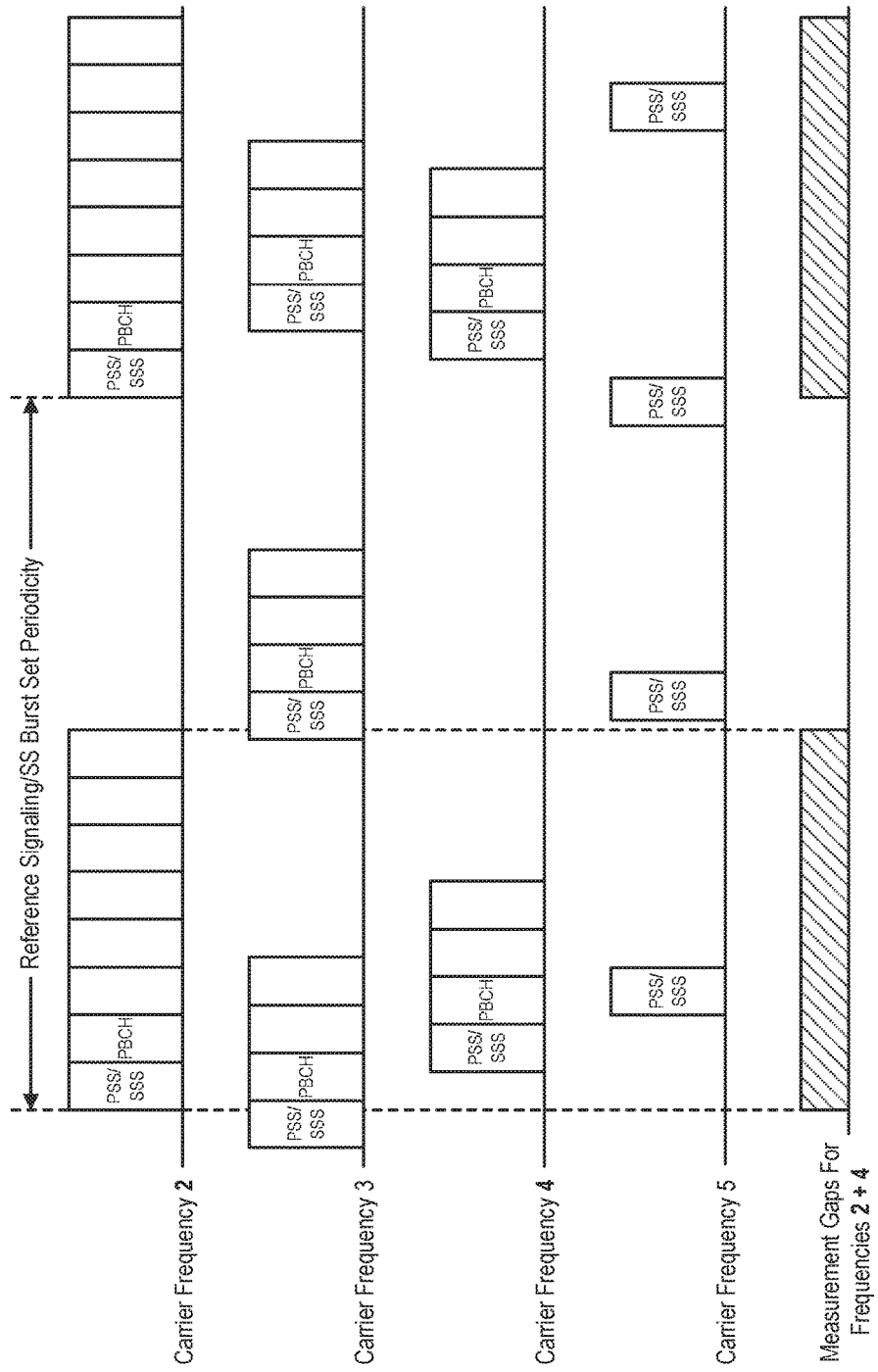
FIG. 5 is an example of a measurement gap pattern for measuring multiple target frequencies in accordance with an embodiment the present disclosure.
Figure 7:
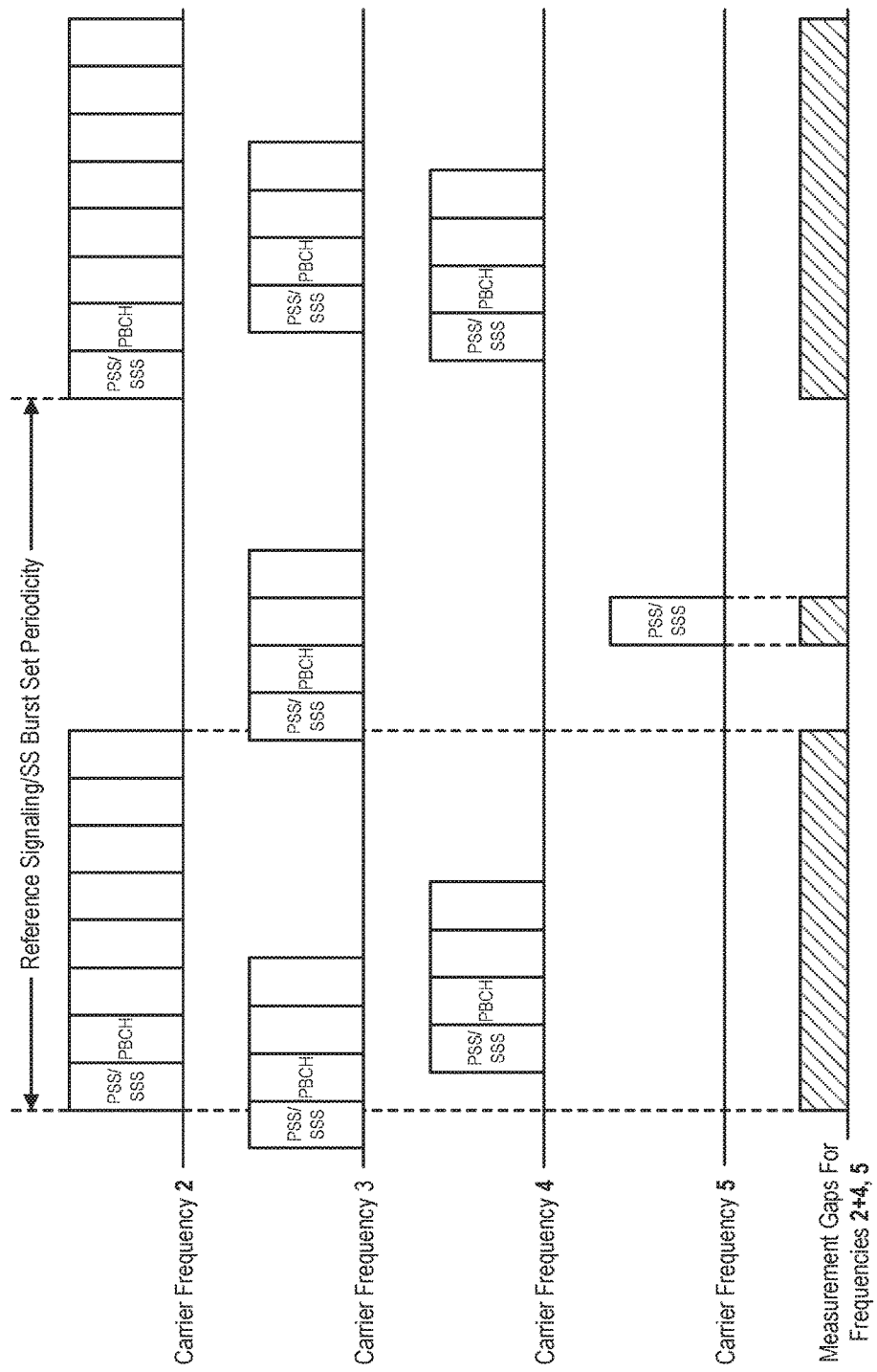
FIG. 7 illustrates a measurement gap patterns for non-overlapping target frequencies in accordance with an embodiment of the present disclosure.
Figure 9:
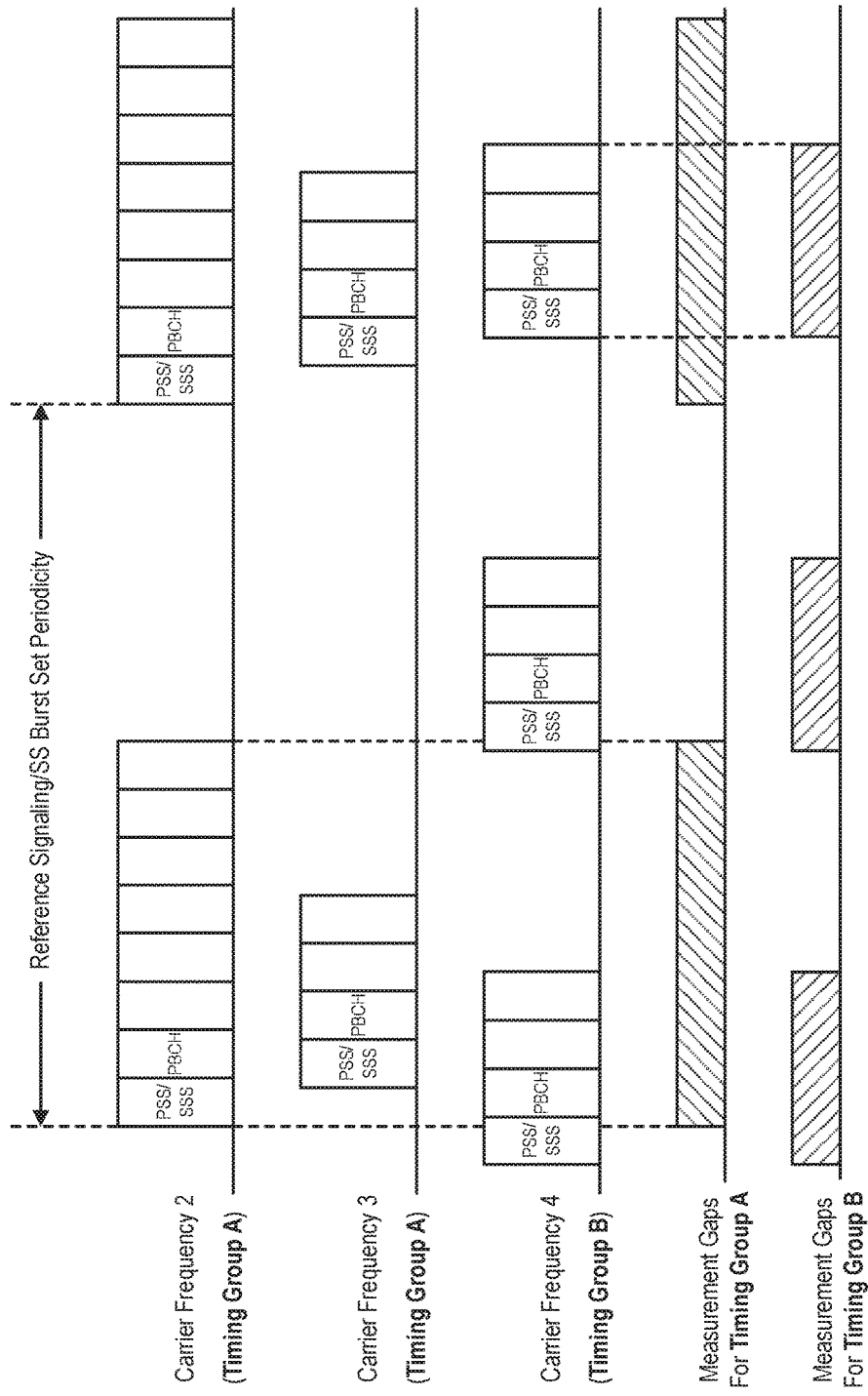
FIG. 9 illustrates a measurement gap pattern for a grouping of target frequencies in accordance with an embodiment of the present disclosure.

For purposes of this disclosure, the serving frequency of the UE 106 and the target frequency are not assumed to be synchronous. In addition, it is assumed that the serving node (e.g., a gNB) is aware of the timing of the synchronization signal on the target frequency. In certain implementations, such as shown in FIGS. 5, 7 and 9 described below, the length of a reference signal is a property of the target frequency (e.g., reference signals on different target frequencies may have differing lengths). For example, in an SS burst set at least one SS block is typically sent in each beam direction of a cell. Accordingly, the length of the SS burst set is dependent upon the beam sweeping pattern utilized by the cell. At relatively low target frequencies which do not rely on beamforming, an SS burst set may consist of a singular SS block or repeated transmissions of the SS block (e.g., to allow for energy accumulation and improved measurement accuracy). The periodicity of an SS burst set is generally determined by a network utilizing the associated target frequency. Although the measurement gap pattern of FIG. 2 can be used to represent a conventional measurement gap pattern, novel techniques are described below regarding the manner in which such a measurement gap pattern can be configured and associated with a target frequency.

Figure 3:
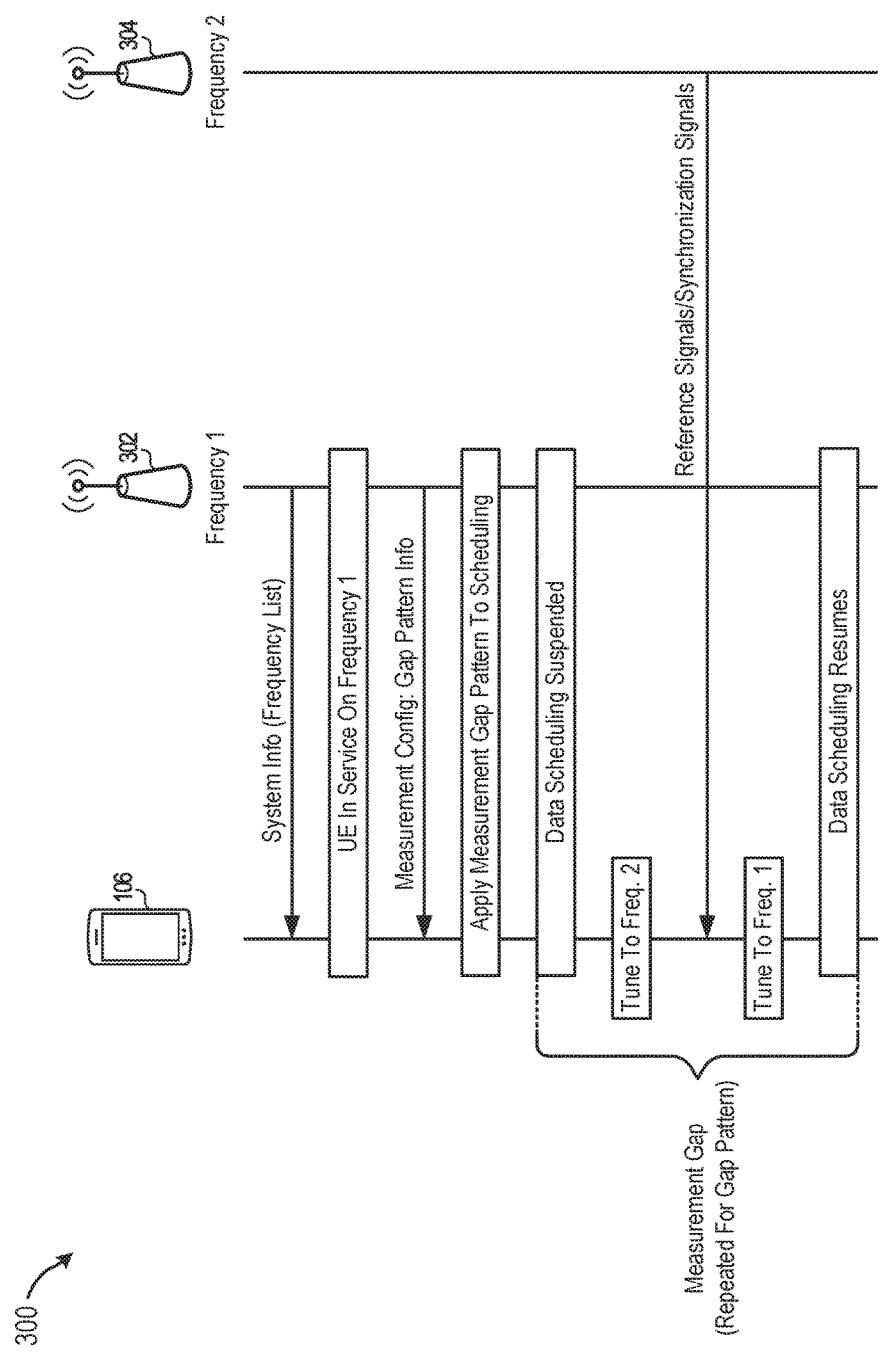
FIG. 3 is a flow diagram illustrating an example of a generalized inter-frequency measurement procedure in accordance with an embodiment of the present disclosure.

FIG. 3 is a flow diagram 300 illustrating an example of a generalized inter-frequency measurement procedure in accordance with an embodiment of the present disclosure. In the illustrated embodiment, a UE 106 obtains system information, including a list of supported frequencies, from TRP 302 via broadcast or on-demand messaging and attaches to TRP 302 over a serving frequency 1. The system information can also include frequency association information such as described below in conjunction with other embodiments. Next, the UE 106 receives a measurement configuration message including frequency-specific measurement gap pattern information and activation conditions. In various embodiments, the measurement gap pattern information can identify values for a measurement gap duration (e.g., in milliseconds), a measurement gap repetition period (or periodicity), a measurement gap offset (e.g., starting position or subframe of a measurement gap), number of measurement gaps, etc. In other embodiments, measurement gap pattern information can include a gap pattern identifier value that is recognizable by a recipient UE. The gap pattern identifier may identify, for example, a predetermined measurement gap duration and measurement gap periodicity. In one example, the measurement gap pattern information may be used by the UE 106 to schedule measurement gaps every 160 ms, the measurement gaps having a duration of 6 ms (e.g., the duration of 6 LTE subframes).

The measurement configuration message further includes frequency identification information identifying frequency 2, and an indication that the measurement gap pattern information is applicable to frequency 2. As described more fully below, the frequency identification information can take many forms. For example, the frequency identification information can include an explicit identifier for each of one or more target frequencies (e.g., an identifier that the UE 106 recognizes as corresponding to frequency 2), a frequency band identifier for a frequency band that includes frequency 2, a timing group identifier (e.g., corresponding to a timing group associated with a plurality of target frequencies that includes frequency 2), etc. In one example, a channel number for a center frequency of the reference signals transmitted on frequency 2 is used as an identifier that the UE 106 recognizes as corresponding to frequency 2.

The indication that the measurement gap pattern information is applicable to a particular frequency may comprise the explicit signaling of an identity or index value for the frequency in conjunction with the measurement gap pattern information. In other embodiments of the present disclosure, the indication may be implicit in the signaling structure. For example, the measurement gap pattern information may be included in a block of signaling that describes the operational parameters of frequency 2. When activation conditions are met, data scheduling is suspended between the TRP 302 and UE 106 during the configured measurement gap. The activation conditions referenced in the present disclosure may include, for example, receipt of measurement gap pattern information by a UE, serving radio conditions, timing criteria (e.g., an activation time and/or periodic schedule), etc. To reduce unnecessary measurement reporting, the measurement report may be conditioned on a variety of triggering events (e.g., when a measured signal strength of a neighboring cell exceeds a defined threshold). Measurement reports can also be scheduled on a periodic basis or an event-triggered periodic basis.

At the beginning of the measurement gap, the UE 106 tunes a receiver to target frequency 2, and receives a reference signal (which can include one or more synchronization signals) from TRP 304. The UE 106 performs one or more measurements on the received reference signal and, at the end of the measurement gap, tunes the receiver back to serving frequency 1. Data scheduling then resumes between the UE 106 and TRP 302, and the UE 106 may transmit a measurement report as appropriate. Measurement operations are repeated in this manner in accordance with the measurement gap pattern.

As noted, generation of a measurement report can be based on one or more measured characteristics of a received reference signal and a reporting configuration (e.g., as stored in a memory of a UE) that specifies one or more measurement report trigger events. Such trigger events may include, for example: a change in the best available serving frequency; the estimated quality of the current serving frequency is below a predetermined threshold and the estimated quality of a target frequency is above a predetermined threshold; the estimated quality of a target frequency is above a configured threshold; the estimated quality of a serving frequency is below a configured threshold; the estimated quality of a target frequency is below a configured threshold; the estimated quality of a serving frequency is above a configured threshold; etc.

In certain embodiments, the UE 106 may be configured to opportunistically measure frequencies other than target frequency 2 during a measurement gap. For example, the UE 106 could simultaneously measure frequencies for which it does not need measurement gaps. Such frequencies can include frequencies serviced by a separate receiver (or "Rx chain"/"receiver chain") of UE 106. It is noted that the network serving UE 106 may have no direct way of determining when the UE 106 is tuned away from serving frequency 1 and performing measurement operations, and that TRP 302 may typically activate the measurement gap pattern from the time it is sent to UE 106. Accordingly, it is desirable to minimize the amount of time spent performing the inter-frequency measurement procedure. Certain embodiments of the present disclosure reduce the duration and overhead associated with prior approaches to inter-frequency measurements.

Figure 4:
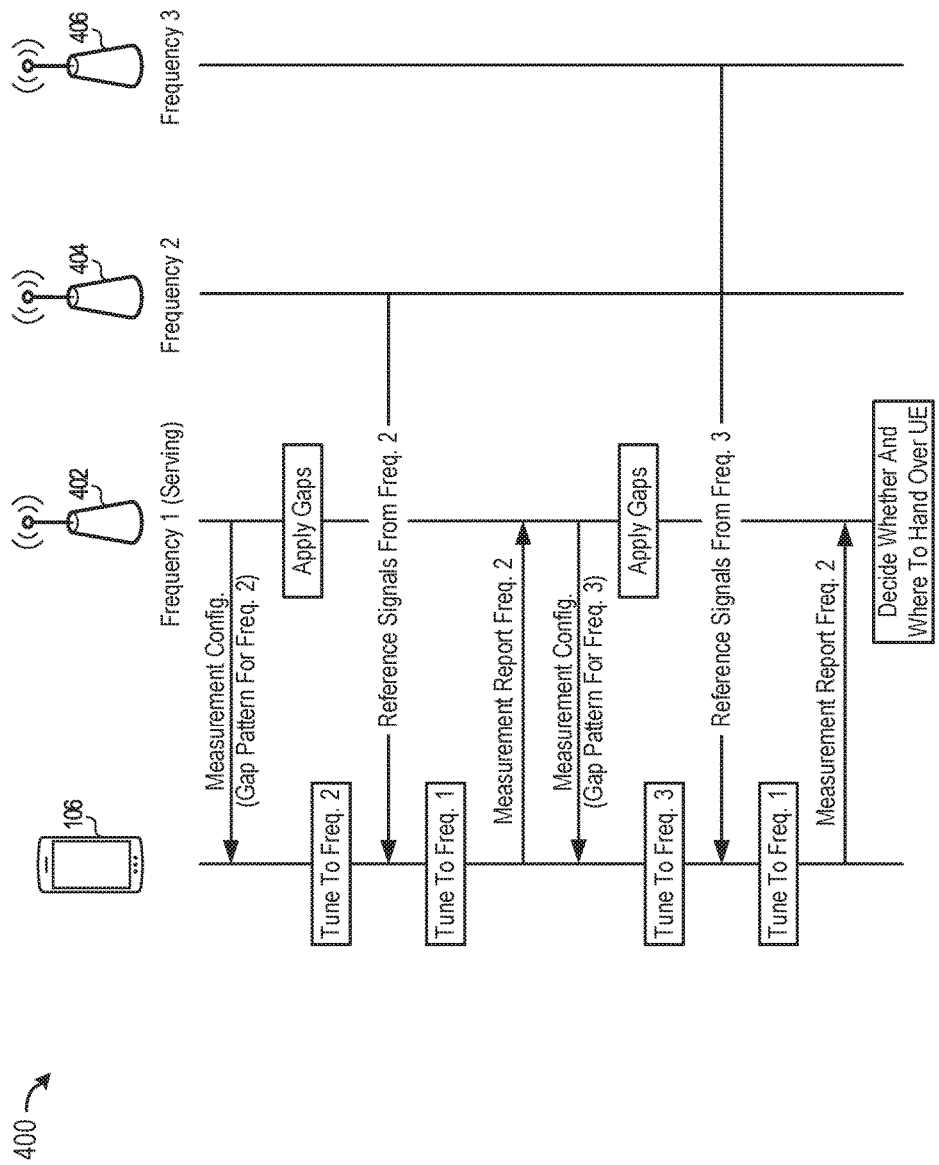
FIG. 4 is a flow diagram illustrating an example of inter-frequency measurement procedures for multiple target frequencies in accordance with an embodiment of the present disclosure.

FIG. 4 is a flow diagram 400 illustrating an example of inter-frequency measurement procedures for multiple target frequencies in accordance with the present disclosure. In this embodiment, separate measurement configuration messages are used to individually target specified frequencies. For example, the UE 106 receives, from TRP 402 via serving frequency 1, a first measurement configuration message including measurement gap pattern information and activation conditions specific to target frequency 2. When activation conditions are met, the UE 106 tunes a receiver to target frequency 2, and receives a reference signal (which can include one or more synchronization signals) from TRP 404. The UE 106 performs one or more measurements on the received reference signal and, at the end of the measurement gap, tunes the receiver back to serving frequency 1.

Data scheduling then resumes between the UE 106 and TRP 402, and the UE 106 may transmit a measurement report regarding target frequency 2 as appropriate. In an example, the measurement report includes some or all of the type of measurement performed, the identity(ies) of the neighboring cell(s) meeting the report criteria, and the measurement results.

In the illustrated flow diagram, the UE 106 next receives a second measurement configuration message, including measurement gap pattern information and activation conditions specific to target frequency 3. When activation conditions are met, the UE 106 tunes a receiver to target frequency 3, and receives a reference signal from TRP 406. The UE 106 performs one or more measurements on the received reference signal and tunes the receiver back to serving frequency 1.

As discussed above, the length and periodicity of a reference signal can vary on different target frequencies. The frequency-specific measurement gap patterns shown in FIG. 4, however, effectively inform a measuring UE of the start times of relevant reference signals, allowing the UE to avoid measuring a target frequency during a measurement opportunity in which all or portions of the desired reference signal are absent.

It is further noted that, in practice, many target frequencies can have similar or overlapping reference signals, particularly relatively low frequencies that do not utilize beamforming patterns in reference signals (e.g., these reference signals may be of equal length and/or utilize consistent reference signal numerology). Further, in a given frequency band, it is likely that reference signals in the carrier frequencies are configured consistently. It is therefore possible to measure such frequencies using a common measurement gap pattern as described in the following embodiments of the disclosure.

FIG. 5 is an example of a measurement gap pattern for measuring multiple target frequencies in accordance with an embodiment of the present disclosure. In this example, the illustrated reference signals of various carrier frequencies (which may also be referred to herein as target frequencies as contextually appropriate) have distinct configurations. However, the reference signals of carrier frequencies 2 and 4 have the same periodicity, and are overlapping in time. Accordingly, these reference signals can be measured using a common measurement gap pattern, such as described below in conjunction with FIG. 6. The reference signals of carrier frequencies 3 and 5 have different periodicities than those of carrier frequencies 2 and 4, and are not covered by the illustrated measurement gap pattern. It is noted that reference signals that have the same periodicity, but are badly out of phase, may not be able to share a measurement gap pattern.

Figure 6:
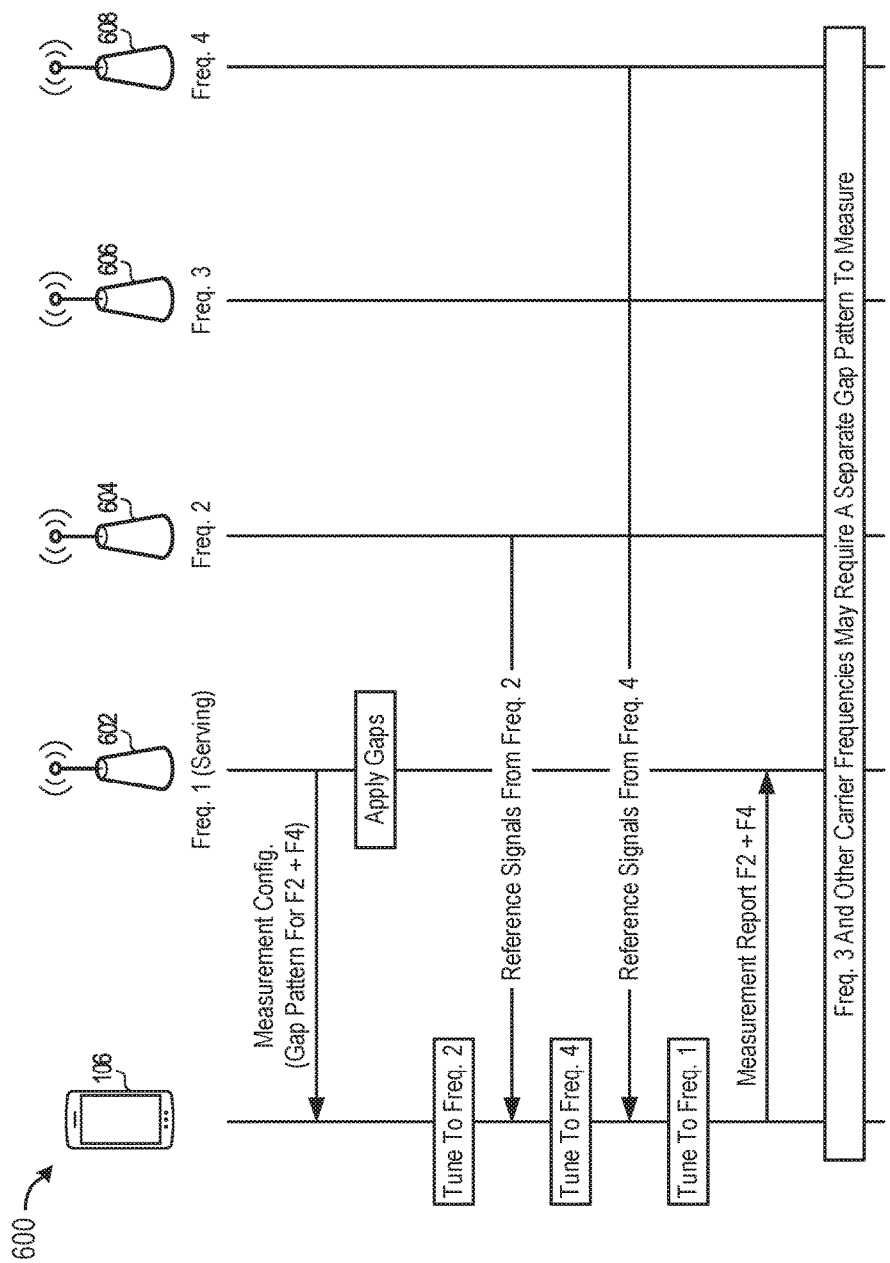
FIG. 6 is a flow diagram illustrating a UE measurement gap configuration for measuring specific target frequencies using a common measurement gap pattern in accordance with an embodiment of the present disclosure.

FIG. 6 is a flow diagram 600 illustrating UE measurement gap configuration for measuring specific target frequencies using a common measurement gap pattern in accordance with an embodiment of the present disclosure. In this embodiment, a single measurement configuration message is used to associate a measurement gap pattern with a plurality of target frequencies. For example, the UE 106 receives, from TRP 602 via serving frequency 1, a measurement configuration message including measurement gap pattern information, and optionally activation conditions, for a measurement gap pattern applicable to target frequency 2 and target frequency 4. The measurement configuration message further includes frequency identification information identifying target frequencies 2 and 4, and an indication the measurement gap pattern information is applicable to target frequencies 2 and 4. When activation conditions (if any) are met, data scheduling is suspended between the TRP 602 and UE 106 during a configured measurement gap, and the UE 106 tunes a receiver to target frequency 2, and receives a reference signal from TRP 604. The UE 106 performs one or more measurements on the received reference signal and tunes the receiver to target frequency 4. After receiving and measuring a reference signal from TRP 608, the UE 106 tunes the receiver back to serving frequency 1 and sends a measurement report (if required) to TRP 602. The measurement report may comprise measurement information regarding one or both of target frequencies 2 and 4. Frequency 3 (utilized by TRP 606) is not measured in the illustrated embodiment.

In addition to temporal overlap of reference signals, factors affecting how a target frequency is handled for purposes of grouping can include, for example: which Rx chain processes the frequency, RF switching requirements, reference signal numerology, interference considerations, whether the frequency can be measured without a measurement gap, etc.

FIG. 7 illustrates an embodiment of measurement gap patterns for non-overlapping target frequencies in accordance with an embodiment of the present disclosure. In this embodiment, a UE is configured with multiple measurement gap patterns that may be simultaneously applied by the UE and a wireless network. For example, a first measurement gap pattern is established for the reference signals of carrier frequencies 2 and 4. These reference signals have the same periodicity and are overlapping in time, and can be measured using a common measurement gap pattern. A second measurement gap pattern is established for the reference signals of carrier frequency 5, which do not overlap in time with the reference signals of carrier frequencies 2 and 4 in this example. Although not explicitly illustrated, the reference signals of carrier frequency 5 (and associated measurement gap pattern) can have the same periodicity as the reference signals of carrier frequencies 2 and 4. In alternative embodiments, the periodicity of the reference signals of carrier frequency 5 may be a multiple of (e.g., may have a period that is two or three times as long as) the reference signals of carrier frequencies 2 and/or 4, with the second measurement gap pattern configured accordingly. The reference signals of carrier frequency 3 have a different periodicity than the other illustrated reference signals, and are not covered by the illustrated measurement gap patterns.

Information for configuring multiple measurement gap patterns, including target frequency information, can be communicated to a UE in various ways. For example, a single measurement configuration message, such as described elsewhere herein, could include measurement gap pattern information for both the first and second measurement gap patterns. In one such example, carrier frequencies 2 and 4 can be explicitly identified as being associated with the first measurement gap pattern, with carrier frequency 5 being indicated as associated with the second measurement gap pattern. In another example, carrier frequencies 2 and 4 could be associated with a common timing group or frequency band identified in a measurement configuration message such as described below. In other embodiments, separate measurement configuration messages may be used to configure the first and second (or additional) measurement gap patterns. In operation, the UE may tune to either of carrier frequency 2 or 4 during a measurement gap of the first measurement gap pattern. A UE having multiple receivers may be configured to independently determine which receiver(s) is utilized to perform measurements for each of the first and second measurement gap patterns.

Figure 8:
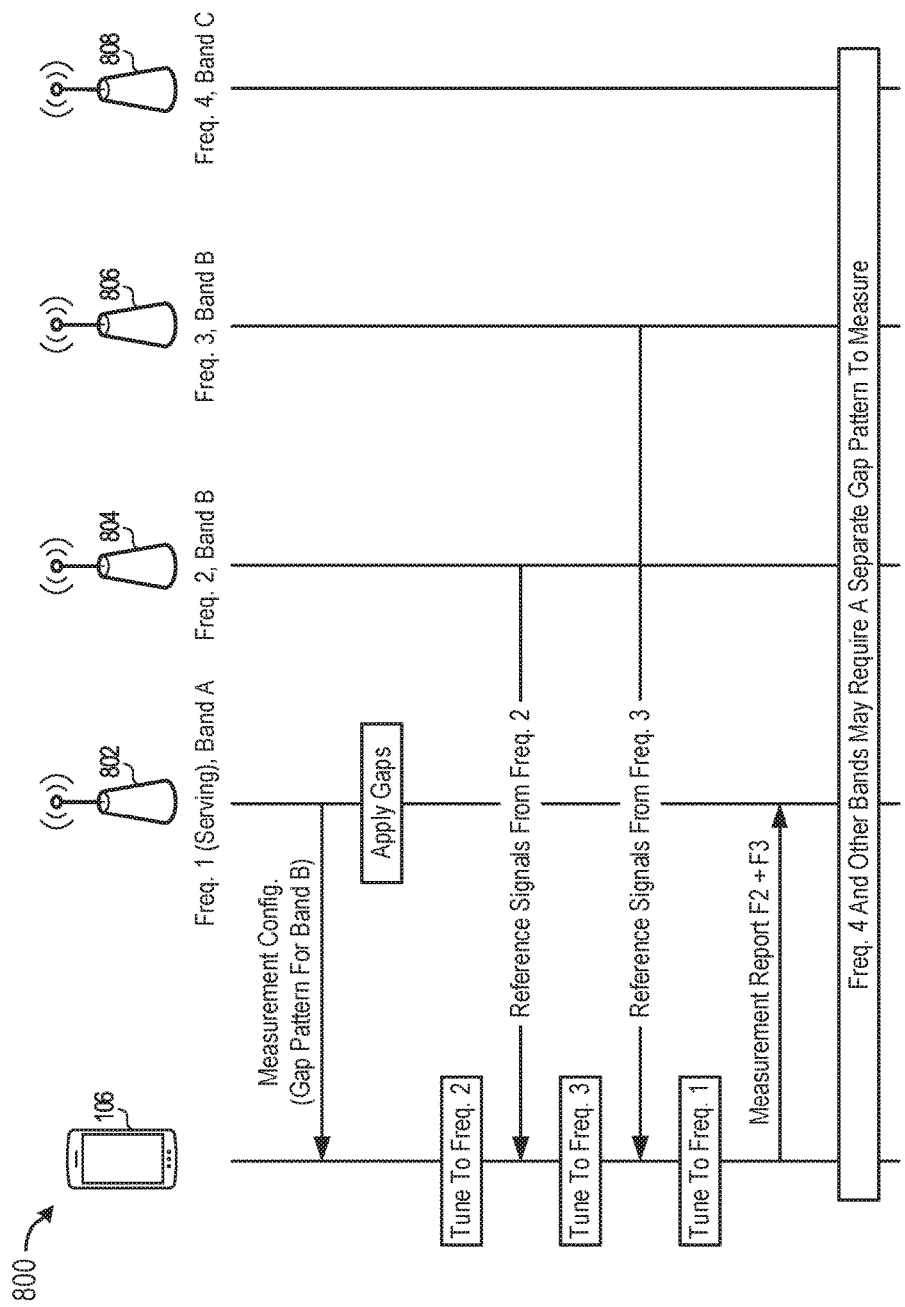
FIG. 8 is a flow diagram illustrating a UE measurement gap configuration for measuring a band of target frequencies using a common measurement gap pattern in accordance with an embodiment of the present disclosure.

FIG. 8 illustrates a flow diagram 800 illustrating UE measurement gap configuration for measuring a band of target frequencies using a common measurement gap pattern in accordance with an embodiment of the present disclosure. As noted, reference signals for frequencies of a given frequency band are often configured similarly and can therefore be measured using the same measurement gap pattern.

In this embodiment, a single measurement configuration message is used to associate a measurement gap pattern with a frequency band. For example, the UE 106 receives, from TRP 802 via serving frequency 1, a measurement configuration message including measurement gap pattern information and activation conditions for a measurement gap pattern applicable to target frequencies (e.g., frequencies 2 and 3) of frequency band B. The measurement configuration message further includes frequency identification information identifying frequency band B. When activation conditions are met, data scheduling is suspended between the TRP 802 and UE 106 during a configured measurement gap, and the UE 106 tunes a receiver to target frequency 2, and receives a reference signal from TRP 804. The UE 106 performs one or more measurements on the received reference signal and tunes the receiver to target frequency 3. After receiving and measuring a reference signal from TRP 806, the UE 106 tunes the receiver back to serving frequency 1 and sends a measurement report (if required) to TRP 802. In various embodiments, the UE 106 is permitted, during measurement gaps, to opportunistically tune the receiver to additional target frequencies of frequency band B. The measurement report may comprise measurement information regarding one or both of target frequencies 2 and 3. Frequency 4 of frequency band C (utilized by TRP 808) is not measured in the illustrated embodiment.

FIG. 9 illustrates an embodiment of a measurement gap pattern for a grouping of target frequencies in accordance with the present disclosure. In this embodiment, timing groups are advantageously established for frequencies that utilize reference signals that overlap in time and can be measured in a shared measurement gap pattern. A timing group according to this embodiment may include any number of target frequencies. In the illustrated example, carrier frequency 2 and carrier frequency 3 are grouped into timing group A, while carrier frequency 4 is included in timing group B (A and B are considered timing group identifiers in this example).

In general, timing groups can be established for target frequencies having reference signal configurations that are closely enough aligned that their measurement gaps are interchangeable. The exact tolerance of the alignment is a network implementation choice, and tradeoffs can exist between highly accurate gap patterns and efficient measurement procedures. The measurement gap patterns herein are for illustrative purposes, and the choice of parameters (e.g., length and periodicity of measurement gaps) and activation conditions can be tailored for different applications and performance requirements.

Further, grouping of target frequencies may take into account the RF capabilities of a measuring UE. For example, consider a UE with two RF front ends that handle frequencies 1/2/3 (with a first RF chain) and 4/5/6 (with a second RF chain). Assuming the network is synchronized and all frequencies have aligning reference signal timing, a single timing group should be able to accommodate all of the frequencies. If the UE is served by frequency 1, measurement gaps are needed for frequencies 2 and 3, but not for frequencies 4/5/6 (i.e., no timing group is required for these frequencies). However, if the UE is in a carrier aggregation (CA) configuration with frequencies 1+4, a timing group can be used for frequencies 5+6. In this example and various other embodiments, a UE can measure, during an applicable measurement gap, any frequency of a timing group for which measurement objects are configured.

In another example, a dual-mode UE operating in LTE may need to measure a combination of LTE and NR frequencies. The legacy LTE gap pattern is sufficient for measuring the LTE frequencies. Accordingly, the UE may be configured with the legacy LTE measurement gap configuration, and automatically interpret it as being applicable to the LTE frequencies. While no new formatting and/or signaling is needed for the LTE measurement gap pattern, the UE does need to recognize that it is not applicable to the NR frequencies. For measuring the NR frequencies, the UE may require frequency-specific measurement gap patterns and associated signaling, such as described in the present disclosure. The UE is expected to recognize which configuration applies to the various frequencies, and only measure the NR frequencies when an appropriate frequency-specific measurement gap pattern is activated.

Figure 10:
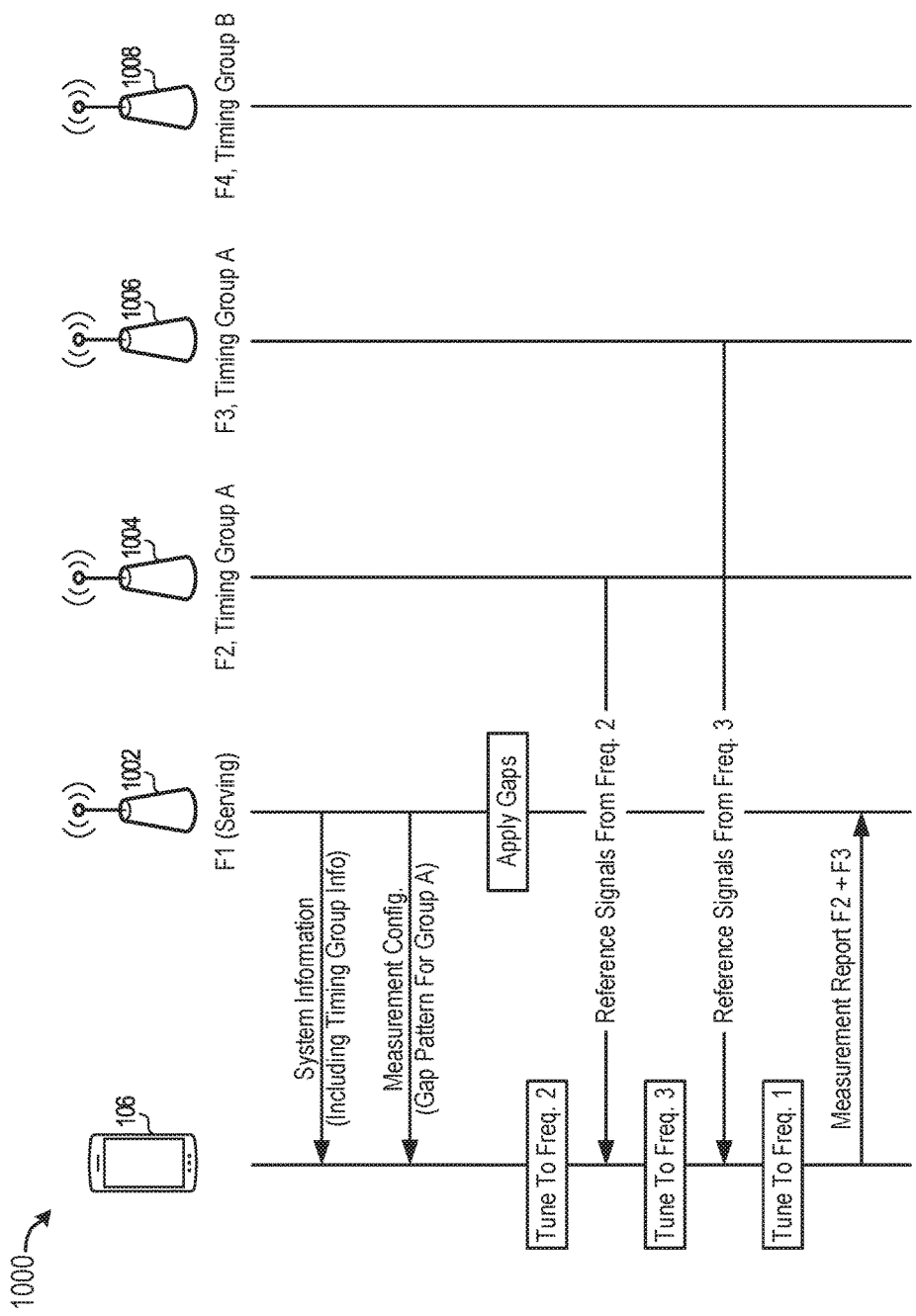
FIG. 10 is a flow diagram illustrating a UE measurement gap configuration for measuring a grouping of target frequencies using a common measurement gap pattern in accordance with an embodiment of the present disclosure.

FIG. 10 illustrates a flow diagram 1000 illustrating UE measurement gap configuration for measuring a grouping of target frequencies using a common measurement gap pattern in accordance with an embodiment of the present disclosure. In this embodiment, a single measurement configuration message is used to associate a measurement gap pattern with a timing group identifier. For example, the UE 106 receives, from TRP 1002 via serving frequency 1, a measurement configuration message including measurement gap pattern information and activation conditions for a measurement gap pattern applicable to timing group A. The measurement configuration message further includes frequency identification information corresponding to timing group A (which can be identifiable to the UE 106 based on stored system information that includes timing group identifiers and frequency associations).

When activation conditions are met, data scheduling is suspended between the TRP 1002 and UE 106 during a configured measurement gap, and the UE 106 tunes a receiver to target frequency 2 of timing group A, and receives a reference signal from TRP 1004. The UE 106 performs one or more measurements on the received reference signal and tunes the receiver to target frequency 3 of timing group A. After receiving and measuring a reference signal from TRP 1006, the UE 106 tunes the receiver back to serving frequency 1 and sends a measurement report (if required) to TRP 1002. The measurement report may comprise measurement information regarding one or both of target frequencies 2 and 3. In various embodiments, the UE 106 is permitted, during measurement gaps, to opportunistically tune the receiver to additional target frequencies of timing group A. Frequency 4 of timing group B (utilized by TRP 1008) is not measured in the illustrated embodiment.

Figure 11:
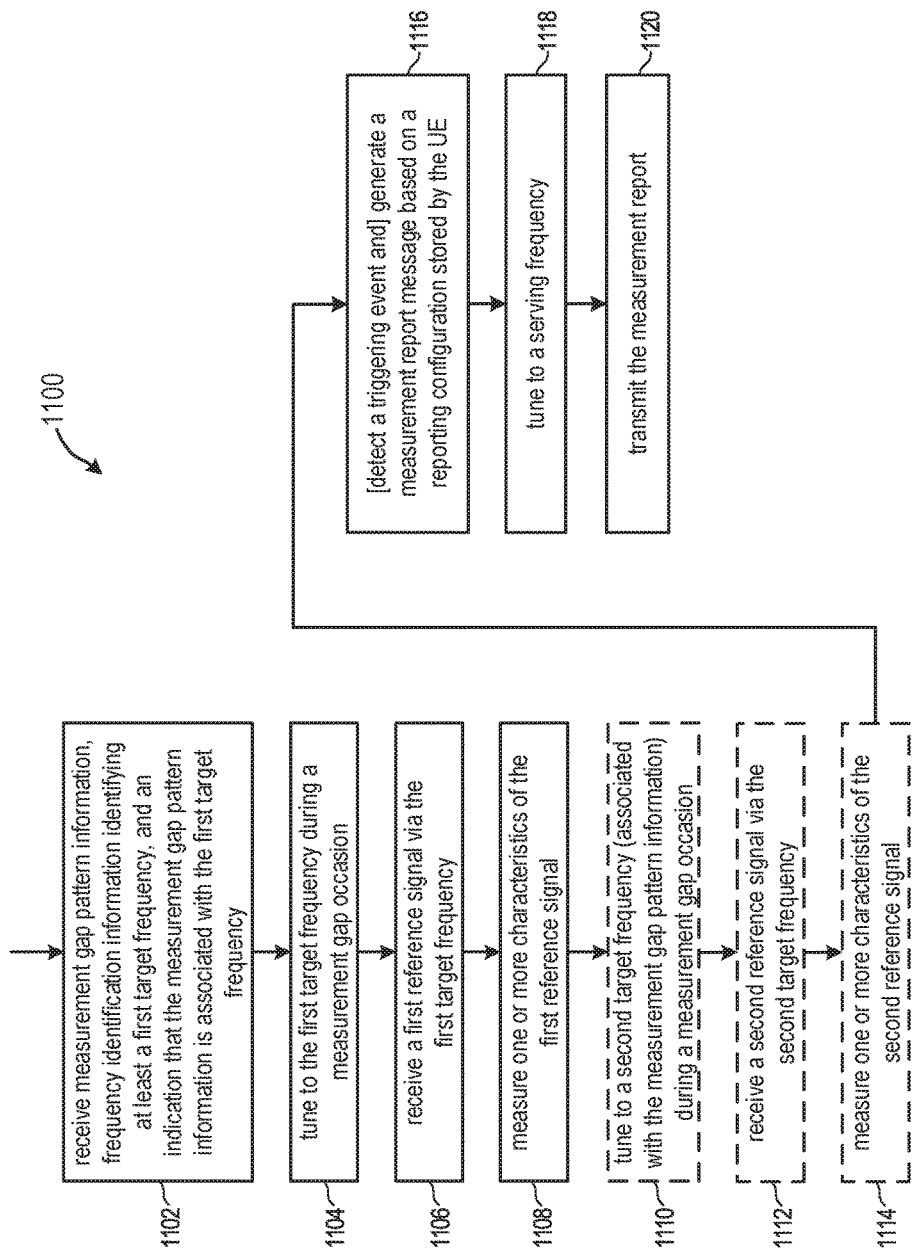
FIG. 11 is a logic diagram illustrating examples of UE measurement gap configuration and application in accordance with embodiments of the present disclosure.

FIG. 11 is a logic diagram 1100 illustrating examples of UE measurement gap configuration and application in accordance with embodiments of the present disclosure. In this embodiment, a UE or similarly functioning device receives (e.g., from a serving node) measurement gap pattern information, frequency identification information identifying at least a first target frequency, and an indication that the measurement gap pattern information is associated with the first target frequency (block 1102). In response, the UE tunes a receiver to the first target frequency during a measurement gap (block 1104) of the measurement gap pattern. Next, the UE receives a first reference signal via the first target frequency (block 1106), and measures one or more characteristics of the first reference signal (block 1108). Optionally, the UE may further tune to a second target frequency (which can also be associated with the measurement gap pattern information) during an additional measurement gap (or even the same measurement gap of block 1104) of the measurement gap (block 1110) and receives a second reference signal via the second target frequency (block 1112). The UE can then measure one or more characteristics of the second reference signal (block 1114).

The UE then generates a measurement report message based on a reporting configuration stored by UE (block 1116). Generation of the measurement report can be conditioned, for example, on one or more triggering events specified by the reporting configuration (such as those described above in conjunction with FIG. 3), and may include information relating to either or both of the first and second reference signals. The UE next tunes to a serving frequency (block 1118) and transmits the measurement report (block 1120) to a serving node. As described more fully above in conjunction with FIGS. 6, 8 and 10, one or more additional target frequencies can be measured by the UE in a similar manner using the same measurement gap pattern.

FIG. 12 is a logic diagram 1200 illustrating examples of measurement gap configuration for a UE in accordance with embodiments of the present disclosure. With reference to block 1102 of FIG. 11, the frequency identification information used by the UE to associate target frequencies with particular measurement gap patterns can include different types of identification information and be communicated to the UE in different ways. In one example, the frequency identification information identifies at least one frequency band that includes the first target frequency (1202). In another example (block 1204), the UE can receive broadcast system information specifying one or more timing group identifiers and respective associated target frequencies (including at least the first target frequency and the second target frequency). In a further example (block 1206), the UE can receive a dedicated configuration message specifying a timing group identifier and associated frequencies (including at least the first target frequency and the second target frequency). Regardless of how a UE receives the frequency identification information, timing group information and/or frequency band information, the UE stores such information in a memory for future use.

As compared to existing protocols such as the LTE RRC protocol, embodiments of the disclosure may use similar signaling messages to convey the measurement configuration. For example, a measurement configuration subunit of an RRC reconfiguration message could contain relevant measurement gap pattern information. However, LTE provides for signaling only a single gap pattern, with no information to associate that gap pattern with particular target frequencies. As described herein, an association between the gap pattern and a set of frequencies (such as frequency identification information that includes an explicit list of frequency identifiers, one or more frequency band identifiers, and/or a timing group identifier) is signaled to a recipient UE. It will be appreciated that there are many ways to structure the signaling to convey such associations, e.g., listing the frequency identifiers for the set(s) of frequencies along with each measurement gap configuration, or including a measurement gap configuration inside a subunit of signaling that describes the frequency sets. As one example, the measurement configuration message could include a structure listing frequency identification information for the frequencies that comprise each timing group, along with the measurement gap pattern information associated with that timing group (thereby providing an indication that the measurement gap pattern information is associated with the timing group).

FIG. 13 is a logic diagram 1300 illustrating an example of generating a measurement gap configuration message in accordance with embodiments of the present disclosure. Measurement gap configuration messages can be generated as shown, for example, by a serving TRP or other node of a serving cell, a C-RAN, or other control elements of a backhaul network (acting alone or in a distributed manner).

In a first step (block 1302), reference signal scheduling associated with a plurality of carrier is determined (e.g., by a serving TRP). Next, at least a first carrier frequency and a second carrier frequency are identified which have associated reference signal scheduling that overlap (at least partially) in time (block 1304). The first carrier frequency and the second carrier frequency are then associated with measurement gap pattern information (block 1306) for an applicable measurement gap pattern. Next (block 1308), the TRP transmits a measurement gap configuration message to a UE (or UEs). The measurement gap configuration message includes the measurement gap pattern information, frequency identification information identifying the first carrier frequency and the second carrier frequency, and an indication that the measurement gap pattern information is associated with (at least) the first carrier frequency. The TRP may then receive responsive signal measurement information from a UE relating to a reference signal transmitted via the first carrier frequency and/or the second carrier frequency (block 1310).

Figure 14:
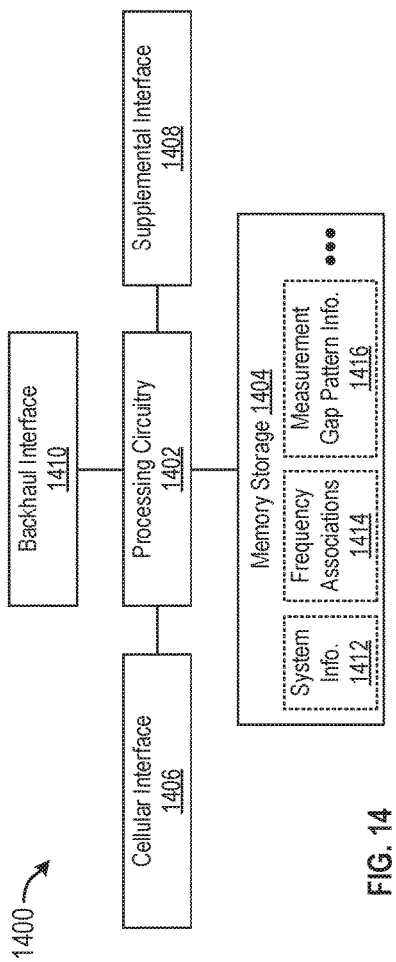
FIG. 14 is a block diagram representation of a transmit/receive point in accordance with an embodiment of the present disclosure.

FIG. 14 is a block diagram representation of a transmit/receive point (TRP) 1400 in accordance with an embodiment of the present disclosure. The TRP 1400 can be equivalent to one or more devices (e.g., base stations, gNBs, site controllers, microcells, picocells, or femtocells) capable of serving UEs via serving frequencies and configuring measurement gap patterns in a wireless network. The illustrated embodiment includes processing circuitry 1402 (which can also be referred to as a processor, judging unit, determining unit, executing unit, or equivalent terminology referencing a component capable of performing computations and/or other processing related tasks), a memory storage 1404, a cellular interface 1406, a supplemental interface 1408, and a backhaul interface 1410, which may (or may not) be arranged as shown in FIG. 14. The processing circuitry 1402 can include, for example, baseband processing circuitry, a reference signal generation module, a frame generation module, a signal mapping module, etc.

The cellular interface 1406 can be any component or collection of components that enable the TRP 1400 to communicate using cellular signals, and is used to receive and transmit information over a cellular connection of a cellular network. The supplemental interface 1408 can be any component or collection of components that allow the TRP 1400 to communicate data or control information via a supplemental protocol. For example, the supplemental interface 1408 can comprise a non-cellular wireless interface for communicating in accordance with an 802.11 or Bluetooth protocol. Alternatively, the supplemental interface 1408 can be a wireline interface. The backhaul interface 1410 can comprise any component or collection of components that enables the TRP 1400 to communicate with one or more other devices via a backhaul network.

The memory storage 1404 can be any type of memory or storage component capable of storing programming and/or instructions for execution by processing circuitry 1402. The illustrated memory storage 1404 includes programming for generating and transmitting measurement configuration messages, such as generally described above in conjunction with FIG. 13. For example, the illustrated memory storage 1404 stores system information 1412, frequency associations information 1414, measurement gap pattern information 1416, and other information.

Figure 15:
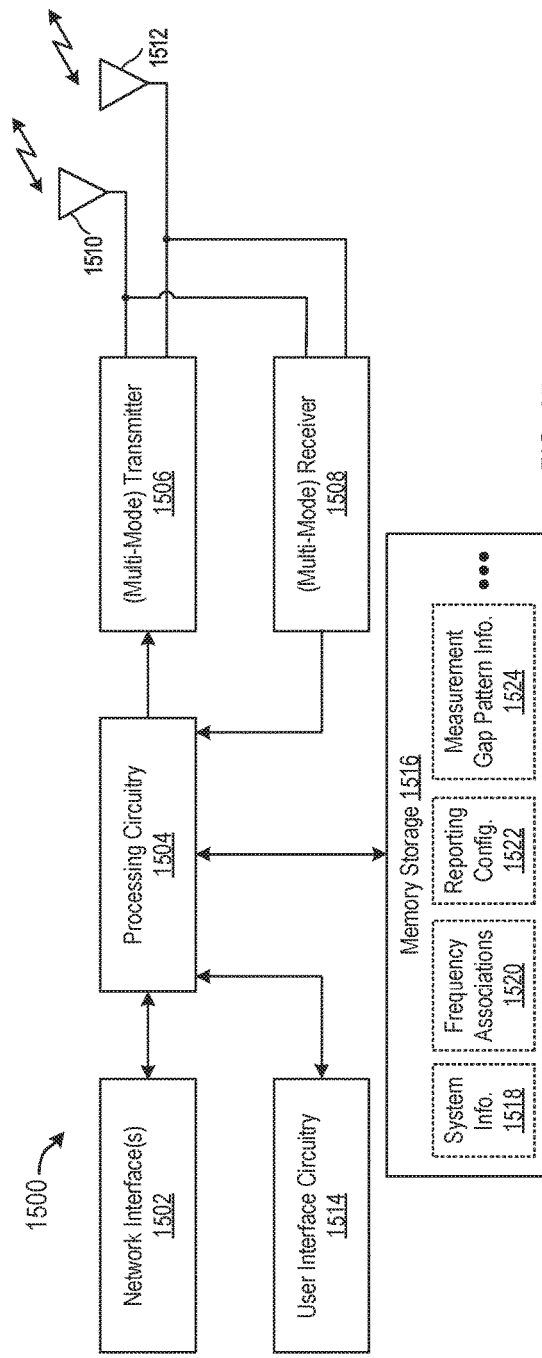
FIG. 15 is a block diagram representation of a UE in accordance with an embodiment of the present disclosure.

FIG. 15 is a block diagram representation of a UE 1500 in accordance with an embodiment of the present disclosure. The UE 1500 is configurable to implement the measurement gap patterns described above and generate measurement reports. In the illustrated embodiment, the (multi-mode) receiver 1508 (alternatively referred to as a receiving unit or receiver circuitry) receives radio frequency signals bearing information from one or more remote TRPs. Such information can include measurement configuration messages, measurement gap pattern information, frequency identification information corresponding to target frequencies supported by the UE 1500, linking indications associating measurement gap pattern information and target frequencies, and reference signaling. The receiver 1508 may be tuned between various serving and target frequencies in accordance with measurement gap pattern information as generally described above.

In some examples, a low noise amplifier and a filter (not shown) cooperate to amplify and remove broadband interference from received signals for processing. Down-conversion and digitization circuitry (also not shown) then down-converts the filtered, received signals to intermediate or baseband frequency signals, which are digitized into one or more digital streams.

The processing circuitry 1504 processes the digitized received signals to extract information or data bits conveyed in the received signals (e.g., to perform measurement operations relating to one or more characteristics of received reference signals). This processing typically includes demodulation, decoding, and error correction operations. Accordingly, the processing circuitry 1504 is generally implemented in one or more DSPs or application-specific integrated circuits (ASICs).

For transmissions, the processing circuitry 1504 receives and/or generates digitized data, which may represent measurement report messages based on received reference signals, voice and/or other data from user interface circuitry 1514, information from the (optional) network interface(s) 1502, and/or other information, and encodes the data for transmission. The encoded data is output to the (multi-mode) transmitter 1506 (alternatively referred to as a transmitting unit or transmitter circuitry), where the encoded data is modulated by a carrier signal having a desired transmit frequency or frequencies. A power amplifier (not shown) functions to amplify the modulated carrier signal to a level appropriate for transmission, and deliver the modulated carrier signal to the antennas 1510/1512 through a matching network (also not shown). Collectively, various of the foregoing elements form one or more transmit radio frequency (RF) chains and one or more receive RF chains of the UE 1500. In certain embodiments, such as a full-duplex UE incorporating self-interference mitigation technology, signals may be concurrently transmitted and received using multiple antennas 1510/1512.

Memory storage 1516 is also coupled to the processing circuitry 1504, and stores programming and/or instructions that, when executed by the processing circuitry 1504, cause the UE 1500 to perform reference signal measurement and reporting operations such as described in conjunction with FIGS. 11 and 12. For example, the illustrated memory storage 1516 stores system information 1518 such as may be received from broadcast messaging or via dedicated signaling; frequency associations 1520 including, for example, carrier frequency information and associated band identifiers and/or timing group identifiers matching identifiers received in measurement configurations messages; reporting configuration information 1522; and measurement gap pattern information 1524.

According to a first aspect of the present disclosure, there is provided a method implemented by a user equipment (UE) that includes receiving, via a serving frequency, a measurement configuration message that includes measurement gap pattern information, frequency identification information identifying at least a first target frequency, and an indication that the measurement gap pattern information is associated with the first target frequency. The measurement gap pattern information specifies at least one measurement gap in which the UE is permitted to tune a receiver to the first target frequency to perform signal measurement operations. The method further includes tuning the receiver to the first target frequency in accordance with the measurement gap pattern information and receiving, by the receiver during the at least one measurement gap, a first reference signal via the first target frequency.

In some embodiments of the method according to the first aspect of the present disclosure or any other aspects thereof, a number of optional operations and features are employed. One optional feature includes generating a measurement report message. In this optional feature, the method further includes measuring one or more characteristics of the first reference signal, generating the message report message based on the one or more characteristics of the first reference signal and a reporting configuration stored by the UE, and transmitting the measurement report via the serving frequency.

Optionally, in any of the preceding aspects the frequency identification information further identifies a second target frequency and the measurement configuration message further includes an indication that the measurement gap pattern information is associated with the second target frequency, and the method further includes tuning the receiver to the second target frequency in accordance with the measurement gap pattern information. In this optional feature, the method further includes receiving, by the receiver during the at least one measurement gap, a second reference signal via the second target frequency and measuring, by the UE, one or more characteristics of the second reference signal. Generating the measurement report message is further based on one or more measured characteristics of the second reference signal.

Optionally, in any of the preceding aspects, the method further includes that the frequency identification information identifies at least one frequency band that includes the first target frequency. Optionally, in any of the preceding aspects, the method further includes that the UE is permitted, during the at least one measurement gap, to tune the receiver to any target frequency associated with the frequency band.

Optionally, in any of the preceding aspects, the method further includes that the frequency identification information a timing group identifier associated with the first target frequency.

According to another optional feature in any of the preceding aspects, the method further includes receiving broadcast system information specifying the timing group identifier and associated frequencies, the associated frequencies including at least the first target frequency and a second target frequency, and storing the broadcast system information in a memory of the UE.

According to another optional feature in any of the preceding aspects, the method further includes receiving a dedicated configuration message specifying the timing group identifier and associated frequencies, the associated frequencies including at least the first target frequency and a second target frequency, and storing information regarding the timing group identifier and associated frequencies in a memory of the UE.

Optionally, in any of the preceding aspects, the first reference signal is scheduled for periodic transmission via the first target frequency and a second reference signal is scheduled for periodic transmission via the second target frequency, the first reference signal and the second reference signal at least partially overlapping in time. In addition, the frequency identification information further identifies the second target frequency and the measurement configuration message further includes an indication that the measurement gap pattern information is associated with the second target frequency, and the method further utilizing a common radio frequency (RF) chain of the UE to process the first reference signal and the second reference signal.

Optionally, in any of the preceding aspects, the method further includes receiving second measurement gap pattern information, and applying the second measurement gap pattern information exclusively to Long Term Evolution (LTE) frequency bands.

Optionally, in any of the preceding aspects, the first reference signal is scheduled for periodic transmission via the first target frequency and a second reference signal is scheduled for periodic transmission via the second target frequency. In addition, the frequency identification information further identifies the second target frequency and the measurement configuration message further includes an indication that the measurement gap pattern information is associated with the second target frequency, and the method further utilizing a first radio frequency (RF) chain of the UE to process the first reference signal and a second RF chain of the UE to process the second reference signal.

According to another aspect of the present disclosure, there is provided a method implemented by a transmit/receive point that includes determining reference signal scheduling associated with a plurality of carrier frequencies, identifying at least a first carrier frequency and a second carrier frequency of the plurality of carrier frequencies having associated reference signal scheduling that overlaps, at least partially, in time, and associating the first carrier frequency and the second carrier frequency with measurement gap pattern information. In this aspect of the disclosure, the method further includes transmitting, by the transmit/receive point, a measurement gap configuration message for reception by a user equipment (UE) serviced by the transmit/receive point, the measurement gap configuration message including measurement gap pattern information, frequency identification information identifying the first carrier frequency and the second carrier frequency, and an indication that the measurement gap pattern information is associated with the first carrier frequency.

According to one optional feature of this aspect of the present disclosure, the measurement gap pattern information specifies at least one measurement gap in which the UE is permitted to receive signals via either of the first carrier frequency or the second carrier frequency to perform signal measurement operations, and the method further includes suspending downlink transmissions from the transmit/receive point to the UE during the at least one measurement gap.

According to another optional feature, the frequency identification information identifies at least one frequency band that includes the first carrier frequency and the second carrier frequency.

According to another optional feature, the frequency identification information includes a timing group identifier associated with the first carrier frequency and the second carrier frequency.

Optionally, in any of the preceding aspects, the method further includes broadcasting, by the transmit/receive point, system information specifying the timing group identifier and associated frequencies, the associated frequencies including at least the first carrier frequency and the second carrier frequency.

According to another aspect of the present disclosure, a UE is provided for use in a wireless network, the UE including a memory storage comprising instructions and one or more processors in communication with the memory. The one or more processors execute the instructions to receive, on a serving frequency, a measurement configuration message including measurement gap pattern information, frequency identification information identifying at least a first target frequency, and an indication that the measurement gap pattern information is associated with the first target frequency. In this aspect of the disclosure, the measurement gap pattern information specifies at least one measurement gap in which the UE is permitted to tune a receiver to the first target frequency to perform signal measurement operations. The programming further includes instructions to tune the receiver to the first target frequency in accordance with the measurement gap pattern information, receive, during the at least one measurement gap, a first reference signal via the first target frequency, measure one or more characteristics of the first reference signal. The programming further includes instructions to generate a measurement report message based on the one or more characteristics of the first reference signal and a reporting configuration stored by the memory storage and transmit the measurement report message via the serving frequency.

In some embodiments of the UE according to this aspect of the present disclosure or any other aspects thereof, the programming for execution by the processing circuitry further includes instructions to perform or utilize optional operations and features described in conjunction with the method of the first aspect of the disclosure described above.

As may be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may also be used herein, the terms "processing circuitry," "processing circuit," "processor," and/or "processing unit" or their equivalents (such as identified above) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. A processor, processing circuitry, processing circuit, and/or processing unit may be, or further include, memory and/or an integrated memory element, which may be a single memory device, a plurality of memory devices, and/or embedded circuitry of another module, processing circuitry, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuitry, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processor, processing circuitry, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the module, processing circuitry, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of the disclosure have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined if the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the present disclosure. One of average skill in the art will also recognize that the functional building blocks, and other illustrative blocks, modules and components herein, can be implemented as illustrated or by discrete components, application specific integrated circuits, processing circuitries, processors executing appropriate software and the like or any combination thereof.

The one or more embodiments are used herein to illustrate one or more aspects, one or more features, one or more concepts, and/or one or more examples of the disclosure. A physical embodiment of an apparatus, an article of manufacture, a machine, and/or of a process may include one or more of the aspects, features, concepts, examples, etc. described with reference to one or more of the embodiments discussed herein. Further, from Figure to Figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, processing circuitry, hardware, and/or memory that stores operational instructions for performing one or more functions as may be described herein. Note that, if the module is implemented via hardware, the hardware may operate independently and/or in conjunction with software and/or firmware. As also used herein, a module may contain one or more submodules, each of which may be one or more modules.

Although the present disclosure has been described with reference to specific features and embodiments thereof, it is evident that various modifications and combinations can be made thereto without departing from the scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A method implemented by a user equipment (UE), the method comprising:
   receiving a measurement configuration message on a serving frequency, wherein the measurement configuration message comprises:
      measurement gap pattern information specifying a measurement gap duration and periodicity;
      frequency identification information identifying at least a first target frequency and a second target frequency; and
      an indication that the measurement gap pattern information is associated with the first target frequency and the second target frequency,
      the measurement gap pattern information indicating a plurality of measurement gaps in which the UE is permitted to tune a receiver to either of the first target frequency or the second target frequency to perform signal measurement operations;
   tuning the receiver to the first target frequency in accordance with the measurement gap pattern information;
   receiving, by the receiver during a first measurement gap of the plurality of measurement gaps, a first reference signal via the first target frequency;
   tuning the receiver to the second target frequency in accordance with the measurement gap pattern information; and
   receiving, by the receiver during a second measurement gap of the plurality of measurement gaps, a second reference signal via the second target frequency.

2. The method of claim 1, further comprising:
   measuring one or more characteristics of the first reference signal;
   generating a measurement report message based on the one or more characteristics of the first reference signal and a reporting configuration stored by the UE; and
   transmitting the measurement report message via the serving frequency.

3. The method of claim 2, further comprising:
   measuring one or more characteristics of the second reference signal; and
   generating the measurement report message is further based on one or more measured characteristics of the second reference signal.

4. The method of claim 1, wherein the frequency identification information identifies at least one frequency band that includes the first target frequency.

5. The method of claim 4, wherein the frequency band comprises a plurality of frequencies including the second target frequency.

6. The method of claim 1, wherein the frequency identification information includes a timing group identifier associated with the first target frequency and the second target frequency.

7. The method of claim 6, further comprising:
   receiving broadcast system information specifying the timing group identifier; and
   storing the broadcast system information in a memory of the UE.

8. The method of claim 6, further comprising:
   receiving a dedicated configuration message specifying the timing group identifier and associated frequencies, the associated frequencies including at least the first target frequency and the second target frequency; and
   storing information regarding the timing group identifier and associated frequencies in a memory of the UE.

9. The method of claim 1, wherein the first reference signal is scheduled for periodic transmission via the first target frequency and the second reference signal is scheduled for periodic transmission via the second target frequency, the first reference signal overlapping the second reference signal in time.

10. The method of claim 1, further comprising:
    receiving second measurement gap pattern information; and
    applying the second measurement gap pattern information exclusively to Long Term Evolution (LTE) frequency bands.

11. The method of claim 1, wherein the first reference signal is scheduled for periodic transmission via the first target frequency and the second reference signal is scheduled for periodic transmission via the second target frequency, the first reference signal and the second reference signal having a common periodicity, wherein during respective periodic transmission the first reference signal completely overlaps the second reference signal, the method further comprising:
    utilizing a common RF chain of the UE to process the first reference signal and the second reference signal.

12. A method implemented by a transmit/receive point, the method comprising:
    determining reference signal scheduling associated with a plurality of carrier frequencies;
    identifying at least a first carrier frequency and a second carrier frequency of the plurality of carrier frequencies having respective associated reference signal transmission scheduling that overlaps, at least partially, in time;
    associating the first carrier frequency and the second carrier frequency with measurement gap pattern information, such that either of a first reference signal associated with the first carrier frequency or a second reference signal associated with the second carrier frequency are measurable in a given measurement gap specified by the measurement gap pattern information; and transmitting a measurement gap configuration message for reception by a user equipment (UE) serviced by the transmit/receive point, the measurement gap configuration message including:
the measurement gap pattern information;
frequency identification information identifying the first carrier frequency and the second carrier frequency; and
an indication that the measurement gap pattern information is associated with the first carrier frequency and the second carrier frequency.

13. The method of claim 12, wherein the measurement gap pattern information specifies at least one measurement gap in which the UE is permitted to receive signals via either of the first carrier frequency or the second carrier frequency to perform signal measurement operations, the method further comprising:
suspending downlink transmissions from the transmit/receive point to the UE during the at least one measurement gap.

14. The method of claim 12, wherein the frequency identification information identifies at least one frequency band that includes the first carrier frequency and the second carrier frequency.

15. The method of claim 12, wherein the frequency identification information includes a timing group identifier associated with the first carrier frequency and the second carrier frequency.

16. The method of claim 15, further comprising:
broadcasting system information specifying the timing group identifier and associated frequencies, the associated frequencies including at least the first carrier frequency and the second carrier frequency.

17. A user equipment (UE) comprising:
a memory storage comprising instructions; and
one or more processors in communication with the memory, wherein the one or more processors execute the instructions to:
receive on a serving frequency a measurement configuration message comprising:
measurement gap pattern information specifying a measurement gap duration and periodicity;
frequency identification information identifying at least a first target frequency and a second target frequency; and
an indication that the measurement gap pattern information is associated with the first target frequency and the second target frequency,
the measurement gap pattern information indicating a plurality of measurement gaps in which the UE is permitted to tune a receiver of the UE to either of the first target frequency or the second target frequency to perform signal measurement operations;
tune the receiver to the first target frequency in accordance with the measurement gap pattern information;
receive, by the receiver during a first measurement gap of the plurality of measurement gaps, a first reference signal via the first target frequency;
measure one or more characteristics of the first reference signal;
tune the receiver to the second target frequency in accordance with the measurement gap pattern information;
receive, by the receiver during a second measurement gap of the plurality of measurement gaps, a second reference signal via the second target frequency;
measure one or more characteristics of the second reference signal;
generate a measurement report message based on the one or more characteristics of the first reference signal, the one or more characteristics of the second reference signal, and a reporting configuration stored by the memory storage; and
transmit the measurement report message via the serving frequency.

18. The UE of claim 17, wherein the frequency identification information identifies at least one frequency band that includes the first target frequency.

19. The UE of claim 17, wherein the frequency identification information includes a timing group identifier associated with the first target frequency.

20. The UE of claim 19, wherein the one or more processors execute the instructions to:
receive system information specifying the timing group identifier and associated frequencies, the associated frequencies including at least the first target frequency and a second target frequency; and
store the system information in the memory storage.

* * * * *